(12) United States Patent
Kavounas

(10) Patent No.: US 9,266,616 B2
(45) Date of Patent: Feb. 23, 2016

(54) PASSENGER AIRCRAFT EMERGENCY PROCEDURES

(71) Applicant: Peter Apostolos Kavounas, Bellevue, WA (US)

(72) Inventor: Peter Apostolos Kavounas, Bellevue, WA (US)

(*) Notice: Subject to any disclaimer, the term of this patent is extended or adjusted under 35 U.S.C. 154(b) by 0 days.

(21) Appl. No.: 14/631,561

(22) Filed: Feb. 25, 2015

(65) Prior Publication Data

US 2015/0175267 A1 Jun. 25, 2015

Related U.S. Application Data

(62) Division of application No. 14/088,298, filed on Nov. 22, 2013, now abandoned.

(60) Provisional application No. 61/846,005, filed on Jul. 13, 2013.

(51) Int. Cl.
  *B64D 25/00* (2006.01)
  *B64D 45/00* (2006.01)
  *B64D 11/00* (2006.01)
  *B64D 11/06* (2006.01)

(52) U.S. Cl.
  CPC ............ *B64D 25/00* (2013.01); *B64D 11/0015* (2013.01); *B64D 11/0632* (2014.12); *B64D 45/00* (2013.01); *B64D 2045/007* (2013.01); *B64D 2231/00* (2013.01)

(58) Field of Classification Search
  CPC ...................... B64D 11/0015; B64D 11/00151; B64D 11/00152; B64D 11/00153; B64D 11/0632; B64D 2231/00; B64D 2231/02; B64D 2231/025; B64D 2700/62017; B64D 2700/62043; B64D 25/00; B64D 45/00; A62B 7/14
  USPC .......................................................... 701/14
  See application file for complete search history.

(56) References Cited

U.S. PATENT DOCUMENTS

| | | | | | |
|---|---|---|---|---|---|
| 2,934,293 | A | * | 4/1960 | Boehme | A62B 7/14 128/204.29 |
| 3,330,506 | A | * | 7/1967 | Robillard | B64D 11/00 244/118.5 |
| 4,609,166 | A | * | 9/1986 | Brennan | B64D 11/00 244/118.5 |
| 5,655,525 | A | * | 8/1997 | Orr | A62B 25/00 128/201.22 |
| 7,246,620 | B2 | * | 7/2007 | Conroy, Jr. | A61B 5/14551 128/204.29 |
| 7,971,221 | B2 | * | 6/2011 | Lee | H04N 21/2146 244/118.5 |
| 8,321,611 | B2 | * | 11/2012 | Francois | B64D 11/0015 710/62 |
| 8,387,098 | B2 | * | 2/2013 | Kurita | H04N 7/163 725/75 |
| 2005/0052339 | A1 | * | 3/2005 | Sprague | G06F 3/147 |
| 2007/0156031 | A1 | * | 7/2007 | Sullivan | G08B 21/02 600/300 |
| 2009/0108649 | A1 | * | 4/2009 | Kneller | B64D 11/00 297/217.6 |
| 2010/0162325 | A1 | * | 6/2010 | Bonar | H04N 7/18 725/76 |
| 2010/0162327 | A1 | * | 6/2010 | Bonar | B64D 11/0015 725/77 |

(Continued)

*Primary Examiner* — Behrang Badii
*Assistant Examiner* — David Testardi

(57) ABSTRACT

Passenger aircraft includes seats, display screens facing the seats, and oxygen masks. When oxygen masks are deployed, imperative imagery is displayed that urges the passenger to at least don their oxygen mask, then optionally help others, etc. In some of these embodiments, the passenger aircraft further includes input devices. Each passenger can enter an input that indicates they have donned the mask, so as to see further imagery for guidance. These inputs could be stored in the flight data recorder for subsequent analysis. In some embodiments, passengers enter self-reported data using the input devices. The self-reported data can be stored in the flight data recorder for subsequent analysis of situations, such as when oxygen masks have been deployed.

27 Claims, 9 Drawing Sheets

*IMPERATIVE IMAGERY*
*(ENGLISH)*

(56) References Cited

U.S. PATENT DOCUMENTS

2014/0085337 A1* 3/2014 Velten ............... B64D 11/0015
  345/635

2014/0265476 A1* 9/2014 Schneider ............... B60R 99/00
  297/217.1

* cited by examiner

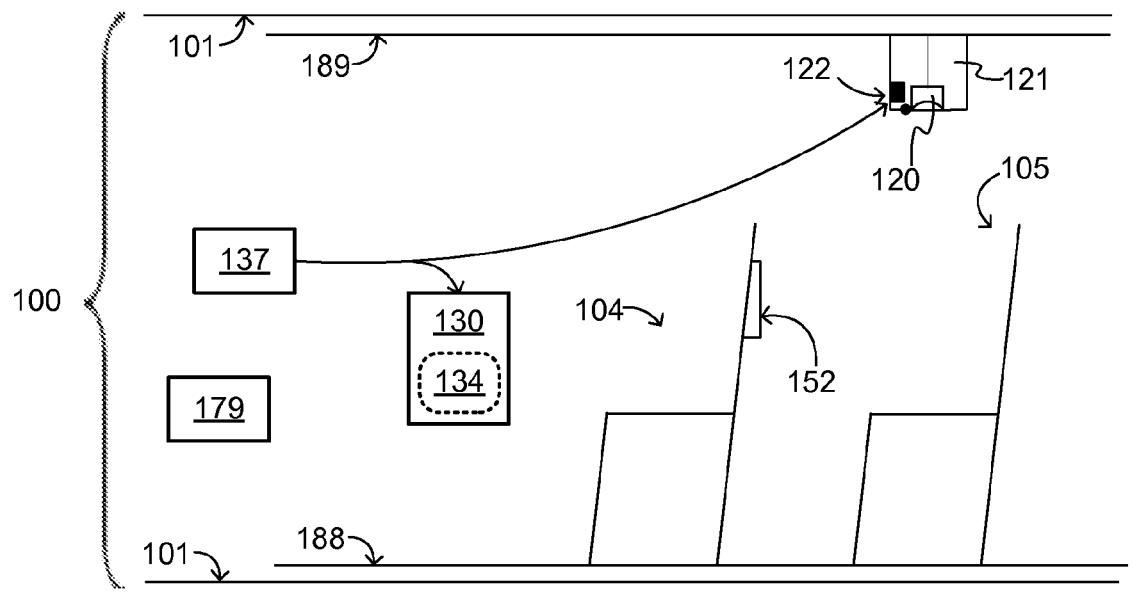
FIG. 1A     *REGULAR OPERATION*
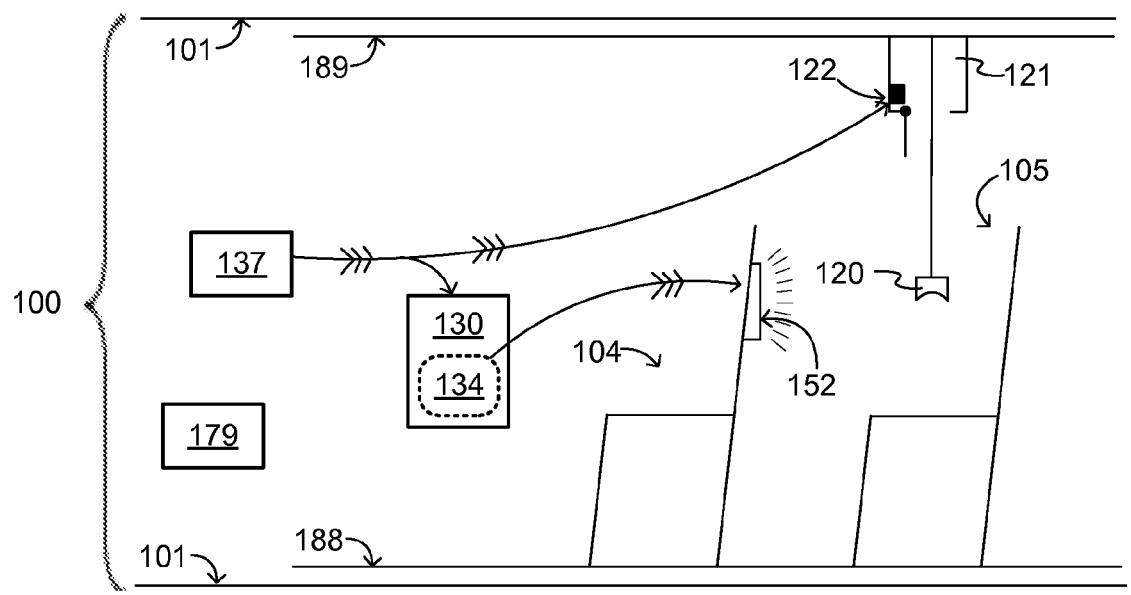
FIG. 1B     *EMERGENCY OPERATION*

*IMPERATIVE IMAGERY (ENGLISH)*

*IMPERATIVE IMAGERY (ENGLISH)*

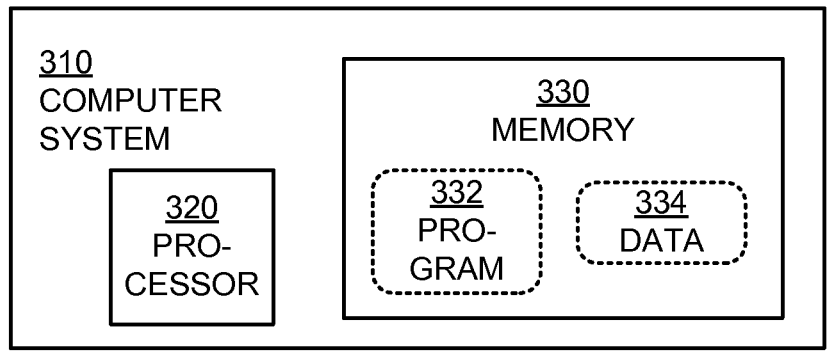
FIG. 3     COMPUTER SYSTEM
ADVANCE INDICATING OF LANGUAGE BY PASSENGER
FIG. 4

*IMPERATIVE IMAGERY (FRENCH)*

*IMPERATIVE IMAGERY (CHINESE)*

FIG. 7     _IMPERATIVE IMAGERY (GREEK)_

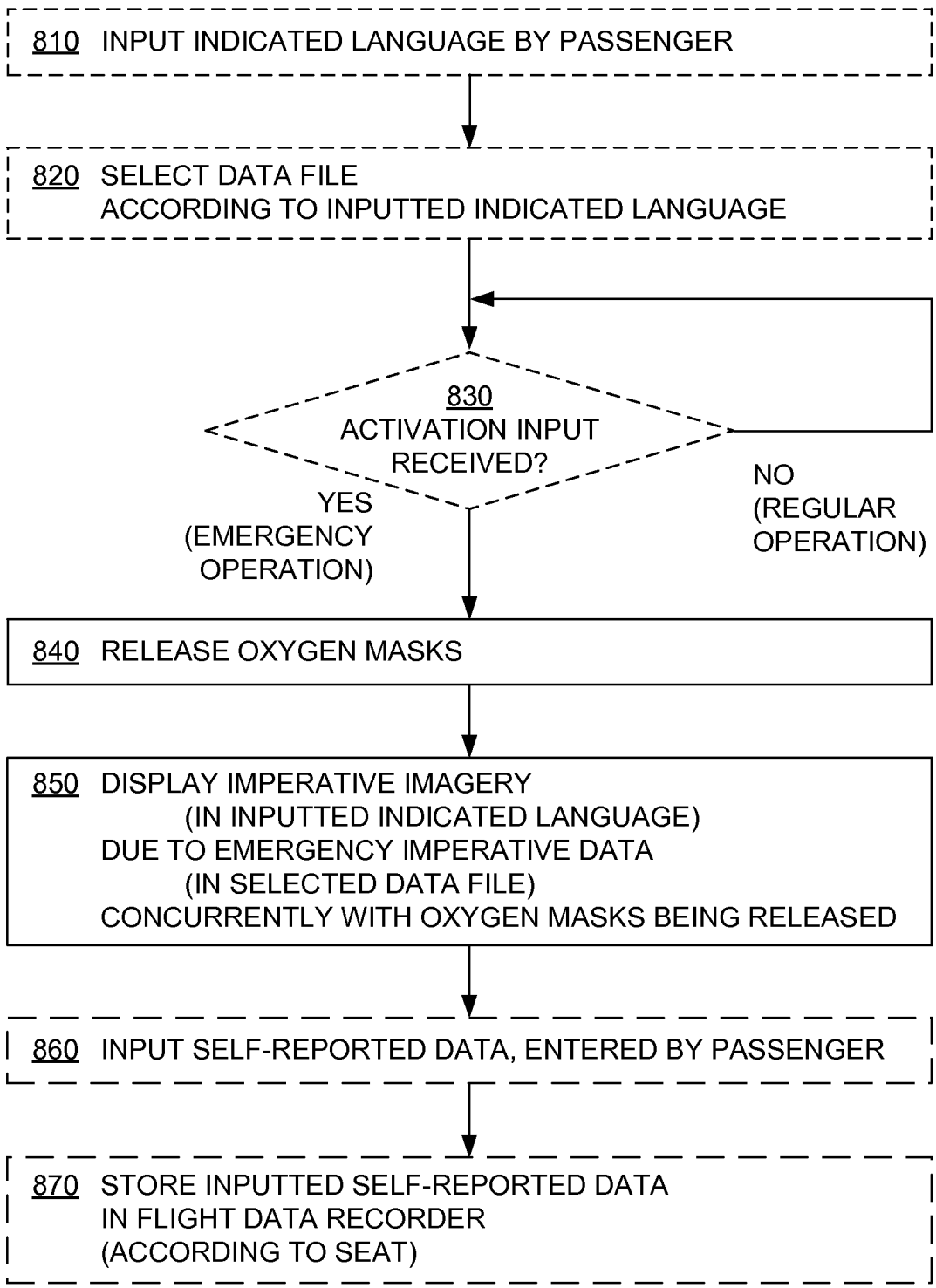
FIG. 8     METHODS

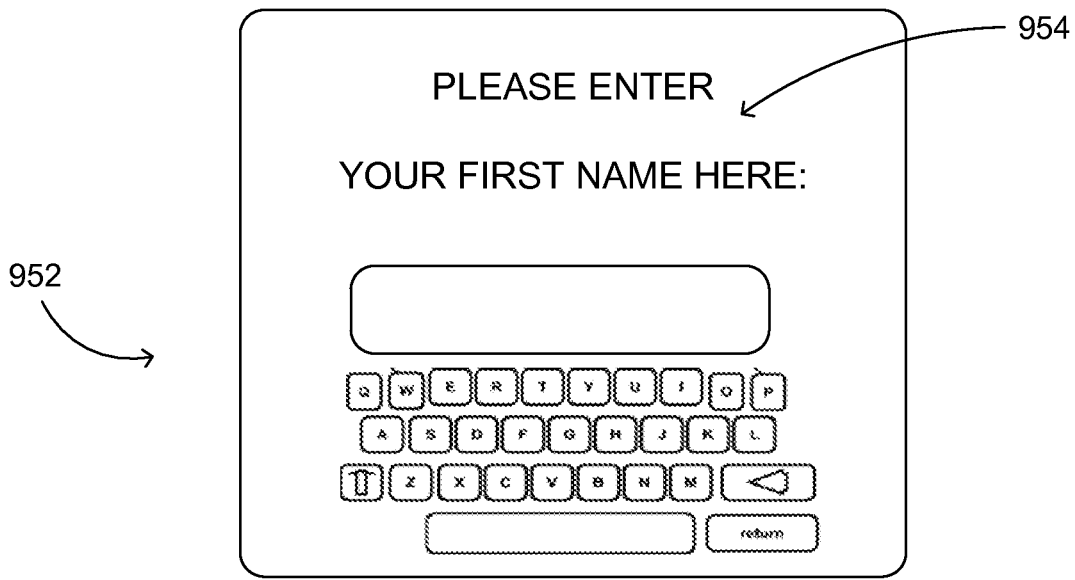
FIG. 9 — IMAGE FOR PASSENGERS TO ENTER SELF-REPORTED DATA FOR FLIGHT DATA RECORDER
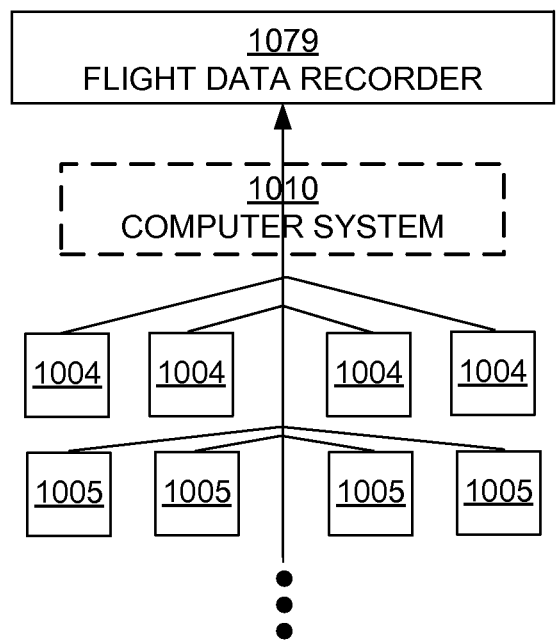
FIG. 10 — PATHS OF SELF-REPORTED DATA

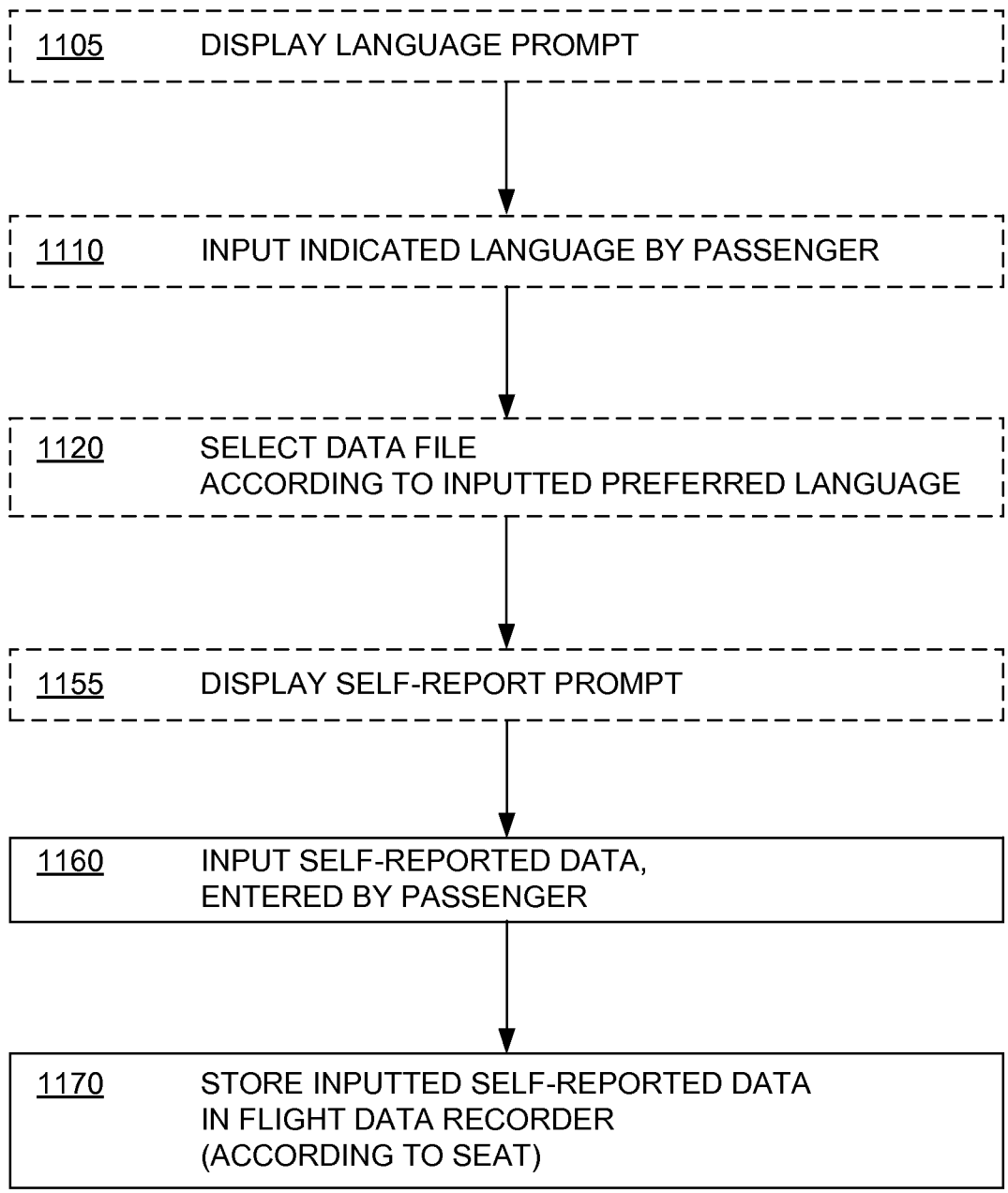
FIG. 11 METHODS

PASSENGER AIRCRAFT EMERGENCY PROCEDURES

CROSS REFERENCE TO RELATED PATENT APPLICATIONS

This patent application is a divisional of U.S. patent application Ser. No. 14/088,298 filed on Nov. 22, 2013, which claims priority from U.S. Provisional Patent Application Ser. No. 61/846,005, filed on Jul. 13, 2013, titled: "PASSENGER AIRCRAFT EMERGENCY PROCEDURES", the disclosure of which is hereby incorporated by reference for all purposes.

BRIEF SUMMARY

The present description gives instances of passenger aircraft, systems, software and methods, the use of which may help overcome problems and limitations of the prior art.

In some embodiments, passenger aircraft includes seats, display screens facing the seats, and oxygen masks. When oxygen masks are deployed, imperative imagery is displayed that urges the passenger to at least don their oxygen mask, then optionally help others, etc. The imperative imagery will be one more guide for the passenger, and especially helpful if it will be difficult to hear an overhead verbal announcement, for example due to noise.

In some of these embodiments, the passenger aircraft further includes input devices. Each passenger can enter an input that indicates they have donned the mask, so as to see further imagery for guidance. These inputs could be stored in the flight data recorder for subsequent analysis.

In some embodiments, passengers can enter self-reported data using the input devices. The self-reported data can be stored in the flight data recorder for subsequent analysis of situations, such as when oxygen masks have been deployed.

These and other features and advantages of this description will become more readily apparent from the following Detailed Description, which proceeds with reference to the drawings, in which:

BRIEF DESCRIPTION OF THE DRAWINGS

FIG. 1A is a mixed diagram that shows components of a portion of a passenger aircraft according to embodiments, in regular operation.

FIG. 1B is the diagram of the components of FIG. 1A, except during a sample emergency operation, according to an embodiment.

FIG. 3 is a diagram of sample computer system according to embodiments.

FIG. 4 is a diagram of a display screen displaying a sample language prompt for a passenger to indicate a language they would prefer to use, according to an embodiment.

FIG. 7 is a diagram of a display screen displaying a sample image urging in Greek a passenger to don an oxygen mask, according to an embodiment.

FIG. 8 is a flowchart for illustrating methods according to embodiments.

FIG. 9 is a diagram of a display screen displaying a sample image with a self-report prompt for a passenger to enter their name, according to an embodiment.

FIG. 10 is a diagram showing sample paths of self-reported data traveling from some seats to a flight data recorder.

FIG. 11 is a flowchart for illustrating methods according to embodiments.

DETAILED DESCRIPTION

Figure 2A:
FIG. 2A is a diagram of a display screen projecting a sample image urging in English a passenger to don an oxygen mask, according to an embodiment.

As has been mentioned, the present description is about passenger aircraft, systems, software and methods. Embodiments are now described in more detail.

FIG. 1A is a mixed diagram that shows components 100 of a portion of a passenger aircraft according to embodiments, in regular operation. FIG. 1B is the diagram of the components of FIG. 1A, except during a sample emergency operation, according to an embodiment. FIG. 1A and FIG. 1B are differential drawings, in that they can be compared for their similarities, and contrasted for their differences.

Components 100 include a fuselage 101. Within fuselage 101 there is a flight data recorder 179, and a cabin with a floor 188 and a ceiling 189 that is often pressurized during flight.

Components 100 also include seats 104, 105 for passengers to sit in. It will be understood that the passenger aircraft will have more such passenger seats.

Components 100 additionally include an oxygen mask 120. Oxygen mask 120 is stored above seat 105 and so oxygen mask 120 can be said to be in the stored position. In this example, oxygen mask 120 is stored in a compartment 121, and the stored position is thus within compartment 121, as seen in FIG. 1A. Compartment 121 can be opened if needed, as seen in FIG. 1B.

Components 100 moreover include a releasing mechanism 122. Releasing mechanism 122 is configured to release oxygen mask 120 from the stored position to a deployed position relative to seat 105, as seen in FIG. 1B. The deployed position is such that a passenger seated in seat 105 can don, or put on, or wear, oxygen mask 120 by first reaching for it with his hands. In this example, where oxygen mask 120 is stored in compartment 121, releasing mechanism 122 opens a door of compartment 121 so as to allow oxygen mask 120 to merely drop to the deployed position, and be suspended by its oxygen tube(s).

Components 100 further include a memory 130. Optionally, memory 130 is part of a computer system, as will be described later in this document. Memory 130 can be configured to store emergency imperative data 134. Data 134 may be responsible for the imperative imagery that will be discussed later. Data 134 could be organized and stored in one or more data files.

Components 100 also include a display screen 152. Display screen 152 is configured to display one or more images to a passenger seated in seat 105, by being mounted in the back of passenger seat 104. It will be understood that additional display screens are provided for passengers seated in additional seats.

Referring to FIG. 1B, display screen 152 can be configured to display due to emergency imperative data 134, which can be performed by directing data 134 to display screen 152. Due to data 134, display screen 152 can be configured to display imperative imagery. The imperative imagery may urge the passenger in seat 105 to at least don oxygen mask 120 immediately, i.e. at a time that the imperative imagery is being displayed. Examples of the imperative imagery will be seen later in this document.

Components 100 also include an activation mechanism 137. Activation mechanism 137 can be configured to cause releasing mechanism 122 to release oxygen mask 120 to the deployed position. Activation mechanism 137 can be configured to cause display screen 152 to display due to emergency imperative data 134, concurrently with oxygen mask 120 being in the deployed position.

Activation mechanism 137 may be implemented in any number of ways. In some embodiments, such as in the example of FIG. 1B, activation mechanism 137 directly causes releasing mechanism 122 to release oxygen mask 120 to the deployed position, and also directly causes display screen 152 to display due to emergency imperative data 134.

In other embodiments, activation mechanism 137 directly causes only the first of the two actions, and the second action takes place because the first action happened. So, activation mechanism 137 could directly cause releasing mechanism 122 to release the oxygen mask 120, while display screen 152 is caused to display responsive to releasing mechanism 122 releasing oxygen mask 120. Or, activation mechanism 137 could directly cause display screen 152 to display, and releasing mechanism 122 releases responsive to display screen 152 being caused to display.

In some embodiments, such as in the example of FIG. 1B, activation mechanism 137 is a standalone module. It can be operable by a crew member of the passenger aircraft. Or, the passenger aircraft can also have a pressure monitor, which configured to issue an alarm if an air pressure within the cabin drops below a threshold. In that case, the activation mechanism can be operable automatically, responsive to the issued alarm. Other embodiments are described later in this document.

The imperative imagery displayed to the passenger is now described in more detail. If there is in-flight entertainment, it is preferably discontinued or overridden. The imperative imagery can include one or more portions, such as fixed images, video, a combination, and so on. The imperative imagery can be designed so as to attract the attention of the passenger. For example, at least a portion of the imperative imagery can be displayed as flashing. Examples of individual images and features are now described.

FIG. 2A is a diagram of a display screen 252 according to an embodiment, which could also be display screen 152. Display screen 252 projects a sample image 254, which can be a portion of the imperative imagery. Image 254 urges in the English language a passenger to don an oxygen mask, ostensibly the one in front of them. For this example, the mask is presumed to be of yellow color, and the words identify also the color. Image 254 has both words and images, such as that of mask 120.

In some embodiments, an initial portion of the imperative imagery appears first. Then a subsequent portion of the imperative imagery appears later, for example at least three seconds after the initial portion has appeared. An example is now described.

Figure 2B:
FIG. 2B is a diagram of the display screen of FIG. 2A, with a sample image following the image of FIG. 2A, suggesting to the passenger to continue when they have donned the oxygen mask, according to an embodiment.

The initial portion of the imperative imagery could be the above described image of FIG. 2A. FIG. 2B is a diagram of display screen 252, with a sample image 255 following image 254, according to an embodiment. Image 255 will not appear for enough time, so as to prevent unnecessarily distracting the passenger from donning the oxygen mask. Image 255, in this example, suggests to the passenger to continue when they have donned the oxygen mask by touching the screen, in this example where the display screen is also a touchscreen.

In some embodiments, the passenger aircraft also includes an input device, which is not shown separately. Such an input device is preferably provided for each passenger seat. In some of these embodiments, the display screen includes a touchscreen, and the touchscreen is the input device. In other embodiments, the input device can include buttons, a moveable cursor, a keyboard that is real or only shown as an image, and so on. The input device can be configured to enable the passenger to enter inputs, so the passenger can enter inputs using the input device.

In such embodiments, a first portion of the imperative imagery may appear first. For example, images 254 and 255 may be that first portion. Further, the imperative imagery may include a continuation prompt. In the example of FIG. 2B, the continuation prompt is image 255. In such cases, a second portion of the imperative imagery may appear only after the passenger has entered a continuation input in the input device, responsive to the continuation prompt. In this case, a second portion of the imperative imagery may be what is shown in FIG. 2C.

Figure 2C:
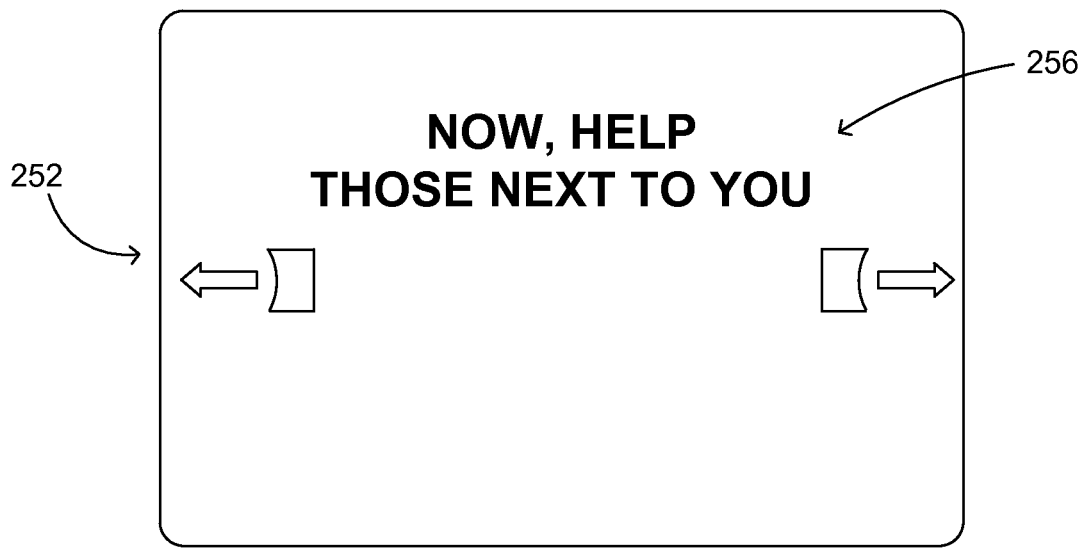
FIG. 2C is a diagram of the display screen of FIG. 2B, with a sample image following the image of FIG. 2B, after the passenger indicates that they have donned the oxygen mask, urging the passenger to help others don their oxygen masks, according to an embodiment.

FIG. 2C is a diagram of display screen 252. A sample image 256 follows image 254, and also image 255, according to an embodiment. Image 256 will appear after the passenger has indicated that they have donned the oxygen mask, by entering the continuation input requested by image 255. Image 256, in this example, urges the passenger to help others don their oxygen masks.

Figure 2D:
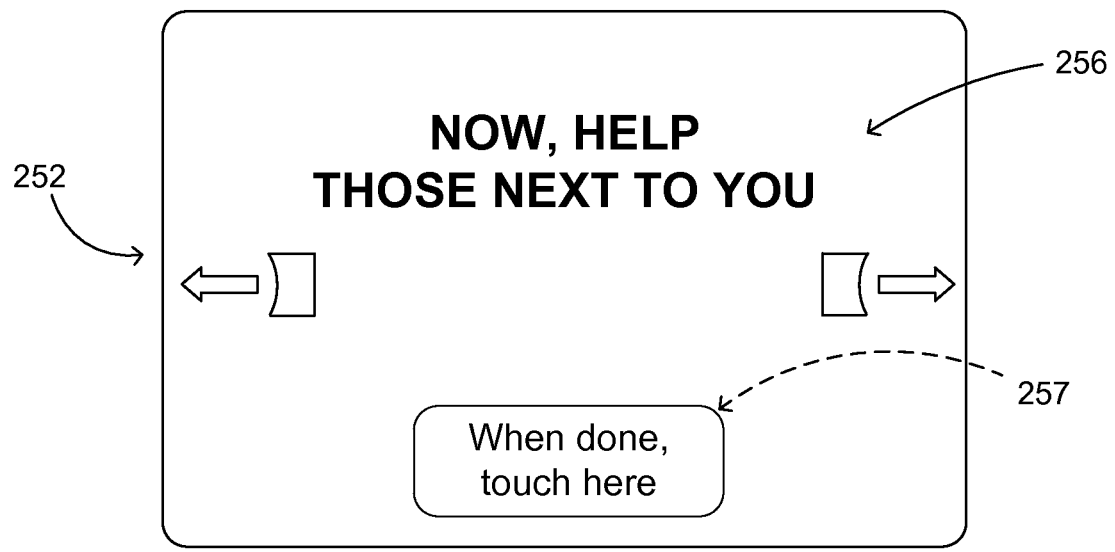
FIG. 2D is a diagram of the display screen of FIG. 2C, with a sample image following the image of FIG. 2C, suggesting to the passenger to continue when they have helped others don their oxygen masks, according to an embodiment.

FIG. 2D is a diagram of display screen 252, with a sample image 257 appearing after image 256, according to an embodiment. Image 257 could appear after image 256 after a delay, for example in the same way that image 255 followed sample image 254 in transitioning from FIG. 2A to FIG. 2B. Sample image 257 suggests to the passenger to continue, when they have helped others don their oxygen masks.

What was true for the second portion of the imperative imagery may also be true for a third. Particularly, the second portion of the imperative imagery may include another, second continuation prompt. In such cases, a third portion of the imperative imagery may appear only after the passenger has entered another continuation input, responsive to the other, second continuation prompt. An example is now described.

The second portion of the imagery could be the above described image of FIG. 2D. Upon touching as suggested by sample image 257, the display could then show a third portion of the imperative imagery. An example of such a third portion will be described later, with reference to FIG. 9.

In some embodiments, a record is stored in the flight data recorder of the continuation input or inputs that the passenger made. This is data that can be analyzed afterwards, in association with the whole event of deploying the oxygen masks.

FIG. 3 is a diagram of sample computer system 310, made according to embodiments. Computer system 310 could be on board a passenger aircraft. Many of the embodiments could be implemented by a computer system, such as computer system 310.

Computer system 310 includes a processor 320. Processor 320 may be a processor programmable for a general purpose, or dedicated processor, such as a microcontroller, a microprocessor, a Digital Signal Processor (DSP), etc.

Computer system 310 includes, coupled with processor 320, a non-transitory storage medium such as memory 330. Memory 330 can be computer-readable, or readable by processor 320. Memory 330 is an example of, and could be, memory 130. The non-transitory storage medium includes, but is not limited to, a volatile memory, a non-volatile memory (NVM), a read only memory (ROM), a random access memory (RAM), a magnetic disk storage medium, an optical storage medium, a smart card, a flash memory device, etc. Memory 330 stores data 334, which may include the above described emergency imperative data 134. Memory 330 also stores one or more programs 332 that may be executed by processor 320. More particularly, programs 332 can include instructions in the form of code, which processor 320 may be able to execute upon reading. Executing is performed by physical manipulations of physical quantities, and may result in functions, processes, actions and/or methods to be performed, and/or processor 320 to cause other devices or components or blocks to perform such functions, processes, actions and/or methods. So, when programs 332 are executed by processor 320, they can result in the embodiments described in this document. For example, computer system 310 can be in communication with any one of the display screens, the input devices, the activation mechanism, and so on. An example is now described.

It was previously described how activation mechanism 137 can be a standalone module. In other embodiments, however, activation mechanism 137 can be combined with computer system 310, or be implemented within computer system 310 in part or completely. In such embodiments, perhaps there is no standalone activation mechanism 137, but the above-mentioned action by a crew member or issued alarm can generate an activation input that is received by computer system 310. In such cases, display screen 152 can display responsive to the activation input being received.

Returning to FIGS. 2A-2D, it will be observed that the imperative imagery was in English. While that serves well the English speaking travelers, embodiments also accommodate those who would prefer a different language.

FIG. 4 is a diagram of a display screen 452, which could also be display screen 152 or 252. Display screen 452 displays a sample language prompt 455, according to an embodiment. Language prompt 455 may help a passenger indicate a language they would prefer to use. In this particular case, language prompt 455 shows flags of different nations. The passenger can choose by using an above described input device. When that happens, the displayed imperative imagery includes at least one word in the indicated language. Examples are now described.

Figure 5:
FIG. 5 is a diagram of a display screen displaying a sample image urging in French a passenger to don an oxygen mask, according to an embodiment.

FIG. 5 is a diagram of a display screen 552. Display screen 552 displays a sample image 554, according to an embodiment. Image 554 urges in the French language a passenger to don an oxygen mask. Display screen 552 also displays a sample image 555, which may appear after image 554.

Figure 6:
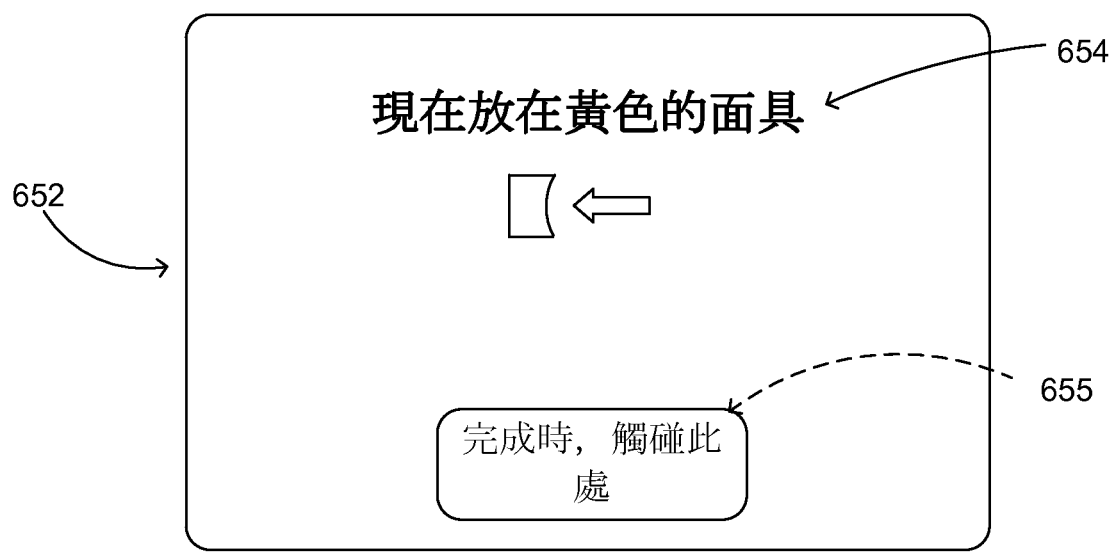
FIG. 6 is a diagram of a display screen displaying a sample image urging in Chinese a passenger to don an oxygen mask, according to an embodiment.

FIG. 6 is a diagram of a display screen 652. Display screen 652 displays a sample image 654, according to an embodiment. Image 654 urges in the Chinese language a passenger to don an oxygen mask. Display screen 652 also displays a sample image 655, which may appear after image 654.

FIG. 7 is a diagram of a display screen 752. Display screen 752 displays a sample image 754, according to an embodiment. Image 754 urges in the Greek language a passenger to don an oxygen mask. Display screen 752 also displays a sample image 755, which may appear after image 754.

By way of explanation, in these cases, the language of the imperative imagery each time is controlled by which emergency imperative data is used every time. The language indicated when the language prompt of FIG. 4 was used may results in selection of the appropriate data file with emergency imperative data. Such may be accomplished also by software, as now described.

Methods and algorithms are described below. These methods and algorithms are not necessarily inherently associated with any particular logic device or other apparatus. Rather, they are advantageously implemented by programs for use by a computing machine, such as computer system 310. Often, for the sake of convenience only, it is preferred to implement and describe a program as various interconnected distinct software modules or features, individually and collectively also known as software. This is not necessary, however, and there may be cases where modules are equivalently aggregated into a single program, even with unclear boundaries. In some instances, software is combined with hardware, in a mix called firmware. This detailed description includes flowcharts, display images, algorithms, and symbolic representations of program operations within at least one computer readable medium. An economy is achieved in that a single set of flowcharts is used to describe both programs, and also methods. So, while flowcharts described methods in terms of boxes, they also concurrently describe programs.

Particular methods are now described. FIG. 8 shows a flowchart 800 for describing methods according to embodiments. The methods of flowchart 800 may also be practiced by embodiments described above, and also by a passenger aircraft that includes a seat configured for a passenger to sit in, a display screen facing the seat, an oxygen mask in a stored position and a release mechanism as described above.

According to an optional operation 810, an indicated language by a passenger is input. The passenger could be seated in the seat. Operation 810 may be accomplished in any number of ways. One such way is to display a language prompt, such as in FIG. 4, for the passenger to indicate the indicated language.

According to another, optional operation 820, at least one data file is selected, from a plurality of data files, responsive to the indicated language. The selected data file includes emergency imperative data, and file may be optionally selected according to availability. The data file may be selected so that the imperative imagery that would be eventually displayed includes at least one word in the indicated language, if such data file is available. Else the data file is selected so that the imperative imagery that would be eventually displayed includes at least one word in a default language. The default language can be a language of one of the origin and the destination of a flight of the aircraft.

Operations 810 and 820 may be accomplished even before takeoff, as a passenger has sat in their seat. If a data file has been selected, it can then be loaded in memory 130 in lieu of another data file for a different language.

According to another, optional operation 830, it can be queried whether an activation input has been received. An activation input has been received as described above. If not, it may mean regular operation of the passenger aircraft. Operation 830 may recycle, even after the passenger aircraft has taken off.

If, at operation 830, an activation input has been received then, according to another operation 840, oxygen masks are released. More particularly, an oxygen mask can be released, e.g. by the releasing mechanism, from the stored position to a deployed position relative to the seat of a passenger.

According to another operation 850, imperative imagery is displayed due to the emergency imperative data. The imperative imagery may urge a passenger seated in the seat to at least don the oxygen mask at a time that the imperative imagery is being displayed. All of what was written above also applies, for example about portions of the imagery. Operation 850 may happen concurrently with operation 840. If a data file has been selected at operation 820, then that is the data file whose emergency imperative data is used for the displaying of operation 850. Accordingly, the displayed imperative imagery could include at least one word in the indicated language.

According to another, optional operation 860, self-reported data is input, which has been entered by the passenger. An example of self-reported data was when the passenger entered continuation prompts, such as in response to image 255 of FIG. 2B and to image 257 of FIG. 2D. More examples of such self-reported data are given later in this document.

According to another, optional operation 870, the inputted self-reported data is stored in the flight data recorder of the passenger aircraft. Examples of operation 870 are also described later in this document.

Embodiments are now described where passengers enter self-reported data that is stored in the data flight recorder. These embodiments use many of the concepts described above, as some of the embodiments above use the concepts below. These embodiments do not necessarily need that operation be an emergency operation of any sort, such as with deploying oxygen masks. However, these embodiments are also applicable to some emergency operations. As such, the entering and the storing can happen while the passenger aircraft is in flight.

For some of these embodiments, an input device is provided for a passenger, as described above. Preferably a display screen is also used. In some of those cases, the display screen may include a touchscreen, which could be the input device.

In some embodiments, the display screen is configured to display to the passenger imagery that includes a self-report prompt. For some of these embodiments, a language prompt, such as language prompt 454, is displayed in the display screen for the passenger to indicate a language. In these embodiments, the self-report prompt may include at least one word in the indicated language.

The imagery could be the imperative imagery described above, but that is not necessary. In such cases, the passenger may enter the self-reported data responsive to the self-report prompt. The self-report prompt could include a question, and the self-reported data may include an answer to the question, which has been entered by the passenger. An example is now described.

FIG. 9 is a diagram of a display screen 952. Display screen 952 displays a sample image 954, according to an embodiment. Image 954 includes a self-report prompt for a passenger to enter their name. The name for each seat would ordinarily be known from the passenger manifest, but passengers sometimes switch seats once on-board.

In some embodiments of asking the passenger's name, the self-report prompt could further include a proposed name, which is looked up from a passenger manifest. Those embodiments, however, carry the risk that someone else can find a passenger's name.

In some embodiments, the seat has an associated seat number. In those cases, the inputted self-reported data can be stored in association with the seat number. Moreover, in some embodiments, an indication of time is stored in association with the seat number. This way it can be known what time entries were made.

FIG. 10 shows a row of seats 1004 and another row of seats 1005. The seats of FIG. 10 are similar to seats 104, 105. There may be additional rows behind the row of seats 1005. FIG. 10 shows a flight data recorder 1079 that is an example of flight data recorder 179, and an optional computer system 1010 that is an example of computer system 310. Self-reported data travels from seats 1004, 1005, to flight data recorder 1079.

In some embodiments, computer system 1010 is not provided, or does not participate in storing self-reported data to flight data recorder 1079. In other embodiments, computer system 1010 receives the self-reported data and stores it to flight data recorder 1079.

FIG. 11 shows a flowchart 1100 for describing methods according to embodiments. The methods of flowchart 1100 may also be practiced by embodiments described above, including a passenger aircraft that has a flight data recorder, a seat configured for a passenger to sit in, and an input device configured to enable a passenger seated in the seat to enter self-reported data.

According to an optional operation 1105, a language prompt is displayed. This can be performed as described above, for example with reference to FIG. 4.

According to another, optional operation 1110, an indicated language by a passenger is input. This can be performed similarly with operation 810.

According to another, optional operation 1120, at least one data file is selected, from a plurality of data files, responsive to the indicated language. This can be performed similarly with operation 820.

According to another, optional operation 1155, a self-report prompt is displayed. Examples are shown in FIGS. 2B, 2D and 9.

According to another operation 1160, self-reported data is input, which has been entered by the passenger. This can be performed similarly with operation 860.

According to another operation 1170, the inputted self-reported data is stored in the flight data recorder of the passenger aircraft.

In the methods described above, each operation can be performed as an affirmative step of doing, or causing to happen, what is written that can take place. Such doing or causing to happen can be by the whole system or device, or just one or more components of it. In addition, the order of operations is not constrained to what is shown, and different orders may be possible according to different embodiments. Moreover, in certain embodiments, new operations may be added, or individual operations may be modified or deleted. The added operations can be, for example, from what is mentioned while primarily describing a different system, device or method.

This description includes one or more examples, but that does not limit how the invention may be practiced. Indeed, examples or embodiments of the invention may be practiced according to what is described, or yet differently, and also in conjunction with other present or future technologies.

Reference to any prior art in this specification is not, and should not be taken as, an acknowledgement or any form of suggestion that this prior art forms parts of the common general knowledge in any country.

A person skilled in the art will be able to practice the present invention in view of this description, which is to be taken as a whole. Details have been included to provide a thorough understanding. In other instances, well-known aspects have not been described, in order to not obscure unnecessarily the present invention.

Other embodiments include combinations and sub-combinations of features described herein, including for example, embodiments that are equivalent to: providing or applying a feature in a different order than in a described embodiment; extracting an individual feature from one embodiment and inserting such feature into another embodiment; removing one or more features from an embodiment; or both removing a feature from an embodiment and adding a feature extracted from another embodiment, while providing the advantages of the features incorporated in such combinations and sub-combinations.

The following claims define certain combinations and sub-combinations of elements, features and steps or operations, which are regarded as novel and non-obvious. Additional claims for other such combinations and subcombinations may be presented in this or a related document.

What is claimed is:

1. A passenger aircraft comprising:
a fuselage;
a seat within the fuselage configured for a passenger to sit in;
an input device configured to enable the passenger to enter inputs;
an oxygen mask stored in a stored position above the seat;
a releasing mechanism configured to release the oxygen mask from the stored position to a deployed position relative to the seat;
a memory configured to store emergency imperative data;
a display screen configured to display one or more images to a passenger seated in the seat, in which the display screen is configured to display, due to the emergency imperative data, imperative imagery that urges the passenger to at least don the oxygen mask at a time that the imperative imagery is being displayed; and
an activation mechanism configured to cause the releasing mechanism to release the oxygen mask to the deployed position in response to a monitored air pressure within a cabin of the aircraft, and also to cause the display screen to display due to the emergency imperative data, concurrently with the oxygen mask being in the deployed position, and
wherein, due to the emergency imperative data, the display screen is configured to display the imperative imagery in which a first portion of the imperative imagery appears first, and includes a continuation prompt requesting a continuation input from the passenger, and
a second portion of the imperative imagery appears only after the passenger has entered the continuation input in the input device, responsive to the continuation prompt.

2. The passenger aircraft of claim 1, in which
the activation mechanism causes the releasing mechanism to release the oxygen mask, and
the display screen is caused to display the imperative imagery responsive to the releasing mechanism releasing the oxygen mask.

3. The passenger aircraft of claim 1, in which
the activation mechanism causes the display screen to display the imperative imagery, and
the releasing mechanism releases the oxygen mask responsive to the display screen being caused to display.

4. The passenger aircraft of claim 1, in which
the first portion of the imperative imagery appears first, and
the second portion of the imperative imagery appears at least three seconds after the first portion has appeared.

5. The passenger aircraft of claim 1, in which
the display screen includes a touchscreen, and
the touchscreen is the input device.

6. The passenger aircraft of claim 1, in which
the second portion of the imperative imagery includes another, second continuation prompt, and
a third portion of the imperative imagery appears only after the passenger has entered another continuation input, responsive to the other, second continuation prompt.

7. The passenger aircraft of claim 1, in which
a flight data recorder is provided within the fuselage, and
the flight recorder is configured to store a record of the entered continuation input.

8. The passenger aircraft of claim 1, in which
the input device being accessible to a passenger seated in the seat, and being configured to indicate a language, and
the displayed imperative imagery includes at least one word in the indicated language.

9. The passenger aircraft of claim 8, in which
the display screen includes a touchscreen, and
the touchscreen is the input device.

10. In combination, a computer system and a passenger aircraft including a seat configured for a passenger to sit in, an input device configured to enable the passenger to enter inputs, a display screen facing the seat, an oxygen mask in a stored position and a release mechanism, the computer system comprising: a processor and a non-transitory storage medium coupled with the processor, the storage medium storing emergency imperative data and one or more programs which, when executed by the processor, result in:
the release mechanism releasing the oxygen mask from the stored position to a deployed position relative to the seat in response to a monitored air pressure within a cabin of the aircraft; and
the display screen displaying, due to the emergency imperative data, imperative imagery that urges a passenger seated in the seat to at least don the oxygen mask at a time that the imperative imagery is being displayed, concurrently with the oxygen mask being in the deployed position, and
in which a first portion of the imperative imagery appears first, and includes a continuation prompt requesting a continuation input from the passenger, and
a second portion of the imperative imagery appears only after the passenger has entered the continuation input in the input device, responsive to the continuation prompt.

11. The combination of claim 10, in which when the one or more programs are executed by the processor
the first portion of the imperative imagery appears first, and
the second portion of the imperative imagery appears at least three seconds after the first portion has appeared.

12. The combination of claim 10, in which when the one or more programs are executed by the processor
the second portion of the imperative imagery includes another, second continuation prompt, and
a third portion of the imperative imagery appears only after the passenger has entered another continuation input, responsive to the other, second continuation prompt.

13. The combination of claim 10, in which
the passenger aircraft further includes a flight data recorder, and
the flight recorder is configured to store a record of the entered continuation input.

14. The combination of claim 10, in which executing the one or more programs further results in:
inputting an indicated language of the passenger seated in the seat, and
in which the displayed imperative imagery includes at least one word in the indicated language.

15. The combination of claim 14, in which executing the one or more programs further results in:
displaying a language prompt for the passenger to indicate the indicated language.

16. The combination of claim 14, in which executing the one or more programs further results in:
selecting, from a plurality of data files, at least one data file with emergency imperative data responsive to the indicated language; and
displaying is performed due to the emergency imperative data of the selected at least one data file.

17. The combination of claim 16, in which
the at least one data file is selected so that the displayed imperative imagery includes at least one word in the indicated language, if such a data file is available,
else the data file is selected so that the displayed imperative imagery includes at least one word in a default language.

18. The combination of claim 17, in which
the default language is a language of one of the origin or the destination of a flight of the aircraft.

19. A method for a passenger aircraft that includes a seat configured for a passenger to sit in, an input device configured to enable the passenger to enter inputs, a display screen facing the seat, a computer system in communication with the input device and the display screen, an oxygen mask in a stored position and a release mechanism, the method comprising:
releasing the oxygen mask from the stored position to a deployed position relative to the seat in response to a monitored air pressure within a cabin of the aircraft; and
displaying in the display screen imperative imagery that urges a passenger seated in the seat to at least don the oxygen mask at a time that the imperative imagery is being displayed, concurrently with the oxygen mask being in the deployed position, and
in which a first portion of the imperative imagery appears first, and includes a continuation prompt requesting a continuation input from the passenger, and
a second portion of the imperative imagery appears only after the passenger has entered the continuation input in the input device, responsive to the continuation prompt.

20. The method of claim 19, in which
the first portion of the imperative imagery appears first, and
the second portion of the imperative imagery appears at least three seconds after the first portion has appeared.

21. The method of claim 19, in which
the second portion of the imperative imagery includes another, second continuation prompt, and
a third portion of the imperative imagery appears only after the passenger has entered another continuation input, responsive to the other, second continuation prompt.

22. The method of claim 19, in which
the passenger aircraft further includes a flight data recorder, and
a record is stored in the flight data recorder of the entered continuation input.

23. The method of claim 19, in which
the passenger aircraft further includes an input device accessible to the passenger seated in the seat, and
further comprising: inputting via the input device an indicated language of a passenger in the seat prior to releasing the oxygen mask, and
in which the displayed imperative imagery includes at least one word in the indicated language.

24. The method of claim 23, further comprising:
displaying a language prompt for the passenger to indicate the indicated language.

25. The method of claim 23, further comprising:
selecting, from a plurality of data files, at least one data file with emergency imperative data responsive to the indicated language; and
displaying is performed due to the emergency imperative data of the selected at least one data file.

26. The method of claim 25, in which
the at least one data file is selected so that the displayed imperative imagery includes at least one word in the indicated language, if such a data file is available,
else the data file is selected so that the displayed imperative imagery includes at least one word in a default language.

27. The method of claim 26, in which
the default language is a language of one of the origin or the destination of a flight of the aircraft.

* * * * *